_United States Patent_ [19]

Kral et al.

[11] Patent Number: 4,956,976
[45] Date of Patent: Sep. 18, 1990

[54] MAGNETIC REFRIGERATION APPARATUS FOR HE II PRODUCTION

[75] Inventors: Stephen F. Kral; John A. Barclay; Peter Claybaker; Steven R. Jaeger, all of Madison, Wis.

[73] Assignee: Astronautics Corporation of America, Milwaukee, Wis.

[21] Appl. No.: 469,186

[22] Filed: Jan. 24, 1990

[51] Int. Cl.$^5$ ............................................. F25B 19/00
[52] U.S. Cl. ........................................ 62/51.3; 62/3.1
[58] Field of Search ................................ 62/3.1, 51.3

[56] References Cited

U.S. PATENT DOCUMENTS

| | | | |
|---|---|---|---|
| 2,510,800 | 6/1950 | Chilowsky | 310/4 |
| 2,619,603 | 11/1952 | Chilowsky | 310/4 |
| 2,648,784 | 8/1953 | Chilowsky | 310/4 |
| 3,108,444 | 10/1963 | Kahn | 62/3 |
| 3,121,265 | 2/1964 | Hoh | 20/62 |
| 3,393,526 | 7/1968 | Pearl | 62/3 |
| 3,413,814 | 12/1968 | Van Geuns | 62/3 |
| 3,743,866 | 7/1973 | Pire | 310/9 |
| 3,774,404 | 11/1973 | Walker | 62/3 |
| 3,841,107 | 10/1974 | Clark | 62/3 |
| 4,033,734 | 7/1977 | Steyert, Jr. et al. | 62/3 |
| 4,069,028 | 1/1978 | Brown | 62/3 |
| 4,107,935 | 8/1978 | Steyert, Jr. | 62/3 |
| 4,332,135 | 6/1982 | Barclay et al. | 62/3 |
| 4,408,463 | 10/1983 | Barclay et al. | 62/3 |
| 4,441,325 | 4/1984 | Bon-Mardion et al. | 62/3 |
| 4,457,135 | 7/1984 | Hakuraku et al. | 62/3 |
| 4,459,811 | 7/1984 | Barclay et al. | 62/3 |
| 4,464,903 | 8/1984 | Nakagome et al. | 62/3 |
| 4,507,927 | 4/1985 | Baclay | 62/3 |
| 4,507,928 | 4/1985 | Johnson | 62/3 |
| 4,554,790 | 11/1985 | Nakagome et al. | 62/3.1 |
| 4,599,866 | 7/1986 | Nakagome et al. | 62/3 |
| 4,642,994 | 2/1987 | Barclay et al. | 62/3 |
| 4,702,090 | 10/1987 | Barclay et al. | 62/3 |
| 4,704,871 | 11/1987 | Barclay et al. | 62/3 |
| 4,727,721 | 3/1988 | Peschka et al. | 62/3.1 |
| 4,727,722 | 3/1988 | Kirol | 63/3.1 |
| 4,735,053 | 4/1988 | Carpetis | 62/3.1 |
| 4,829,770 | 5/1989 | Hashimoto | 62/3.1 |

OTHER PUBLICATIONS

H. Nakagome, et al. "A Parasitic Magnetic Refrigerator for Cooling Superconducting Magnet," IEEE Transactions on Magnetics, vol. 24, No. 2, Mar. 1988, pp. 1113–1116.

Y. Hakuraku, et al., "Conceptual Design of a New Magnetic Refrigerator Operating between 4K and 20K," Japanese Journal of Applied Physics, vol. 24, No. 11, Nov., 1985, pp. 1548–1551.

Magnetic Refrigeration: The Basis for a New Refrigeration Technolog Los Alamos Laboratory Mini-Review, LALP-82-34, Nov., 1982.

(List continued on next page.)

Primary Examiner—Ronald C. Capossela
Attorney, Agent, or Firm—Lathrop & Clark

[57] ABSTRACT

A magnetic refrigeration apparatus (10) is modular in design, so that housing modules (14) are alternately stacked with superconducting magnet pairs (24). Each module (14) has a wheel (16) that is rotated through the module (14), the wheel (16) having cutout regions (18) into which elements (20) of magnetic material are inserted. Each cutout region has two elements (20) separated by a wave spring, the wave spring biasing the elements (20) against the housing module (14) so that the elements (14) are in slidable contact with the module (14) upon rotation. In operation, the wheel (16) carries the elements (20) cyclically between high and low magnetic field zones. In low field regions the elements (20) are cooled by the magnetocaloric effect and heat exchangers absorb heat from either a stagnant subcooled superfluid helium bath or a forced-flow subcooled superfluid helium stream. In high field regions the elements (20) are heated by the magnetocaloric effect and a force-flow stream of liquid helium passes through the high temperature heat exchangers absorbing heat from the magnetic refrigeration apparatus (10).

50 Claims, 8 Drawing Sheets

OTHER PUBLICATIONS

J. A. Barclay et al., "Experimental Results on a Low temperature Magnetic Refrigerator," Adv. in Cryogenic Engineering 31, 743 5/(1986).

Y. Hakuraku, et al., "A Magnetic Refrigerator for Superfluid Helium Equipped with a Rotating Magnetic System," Japanese Journal of Applied Physics, vol. 25, No. 1, Jan., 1986, pp. 140–146.

Y. Hakuraku, et al., "A Rotary Magnetic Refrigerator for Superfluid Helium Production", J. Appl. Phys. 60 (9), 1 Nov. 1986, pp. 3266–3268.

J. A. Barclay, et al., "Magnetic Refrigeration for 4–20K Application Los Alamos National Laboratory report LA UR–84–540", Dec., 1983 Flight Dynamics Laboratory, Air Force Wright Aeronautical laboratories Report AFWAL–TR–83–3210, Air Force Systems Command Wright–Patterson Air Force Base, Ohio, 54533 (this report is subject to export control laws), Jun. 1987.

H. Nakagome et al., "Rotating Magnetic Refrigerator for Helium Liquefaction," Proceedings of the 11th International Cryogenic Engineering Conference, Berlin, FRG, 22–25 Apr. 1986.

MAGNETIC REFRIGERATION APPARATUS FOR HE II PRODUCTION

FIELD OF THE INVENTION

This invention pertains generally to the field of heat transfer and refrigeration apparatus and particularly to magnetic refrigerators.

BACKGROUND OF THE INVENTION

Liquid helium 4 exists as a classical liquid (He I) above the lambda transition and as a quantum liquid (He II) below the lambda transition. The lambda transition temperature is 2.172 Kelvin (K.) at 0.00497 MPa. He II has several unique and useful properties such as an enormous effective heat conductivity. Refrigeration systems operating to temperatures below the helium 4 lambda transition temperature are of interest because of the enhanced heat transfer in He II as well as improved lower temperature performance in superconducting materials.

At present, refrigeration systems, including those for cryogenic applications, are almost entirely based on successive compression and expansion cycles of a gas. Generally, the efficiency of practical gas cycle refrigerators is only a fraction of the ideal Carnot cycle efficiency, and the efficiency generally decreases with a decrease in the size of the refrigerator. The efficiency of gas cycle refrigerators is particularly low at cryogenic temperatures, e.g., in the 2 K. to 20 K. range. Reliability can also be a problem with large refrigeration systems operating to about 2 K.

A typical gas cycle refrigeration system that operates down to He II temperatures has a 1.8 K. static, subcooled He II bath that cools a superconducting coil. The bath results from heat exchange with He II at saturated vapor pressure. Several cold compressors compress the low pressure, cold helium vapor from the saturated He II before the cold gas passes through low pressure heat exchangers to room temperature where additional compressors raise the pressure to 0.1 MPa. The vapor is then recirculated in the refrigeration system. Because of the extensive subatmospheric sections in the flow loop, leaks are a source of reduced reliability. The use of a gas cycle system to cool to He II temperatures also requires large volumes and weights for pumps, compressors, and other equipment.

It has long been known that certain magnetic materials exhibit the magnetocaloric effect: they increase in temperature when placed in a magnetic field and decrease in temperature when removed from the field. Application of a magnetic field to such solid magnetic materials is analogous to compressing a gas (producing an increase in temperature) and removing the field from the solid is analogous to expanding a gas (Producing a decrease in temperature). Thus, it has been recognized that a thermodynamic refrigeration cycle can be achieved using a magnetic material as the working material in a manner analogous to the refrigeration cycles of a gas. Refrigerators utilizing the magnetocaloric effect require several essential components. A magnetic material that exhibits a magnetocaloric effect suited to the intended operating temperature range is the refrigerator's working material. Magnets of sufficient field strength to produce the necessary field changes at the working material are required. Means for effecting the necessary cyclic changes in magnetic field at the working material must be included. Switches enabling heat transfer and heat transfer modes to transfer heat to and from the working material at requisite locations within the refrigerator are necessary. A thermal source from which heat is extracted is necessary, as is a sink to which heat is rejected. Finally, a structure with appropriate thermal, magnetic, and physical properties to support the essential elements of the refrigerator with minimum negative performance impact must be included. Examples of relatively recent designs proposed for magnetic refrigerators are shown in U.S. Pat. Nos. 4,033,734, 4,069,028, 4,107,935, 4,332,135, 4,392,356, 4,408,463, 4,441,325, 4,457,135, 4,459,811, 4,464,903, 4,507,927, 4,507,928, and 4,702,090.

U.S. Pat. No. 4,702,090 to Barclay et al. suggests a design illustrating a realization of these necessary elements. In this refrigerator the magnetic working material is gadolinium gallium garnet ($Gd_3Ga_5O_{12}$), a material suitable for magnetic refrigerators operating over any temperature range between about 1 K. to about 20 K. The working material is attached to a peripherally driven, bearing-mounted wheel. The wheel rotates between the fins of an element called the thermal extractor. Each thermal extractor fin consists of eight equal-sized circular segments of alternating copper and stainless steel. The copper segments are attached to two centrally located copper thermal bus bars of square section. Copper segments attached to the same bus bar are separated by copper segments attached to the other bus bar. The bus bars stand perpendicular to the plane of the wheel's rotation and contain the symmetry axis of the refrigerator. The wheel, its supporting bearing and the thermal extractor fins are contained in a hermetically sealed housing which contains gaseous helium. The peripheral drive mechanism penetrates the housing, as do the two bus bars. Seals are located at these penetrations.

The required magnetic field is produced by two symmetrically placed pairs of magnets, each pair with the housing between them. The magnets are attached to a spherical structure enclosing the magnets and the housing and supporting the large attractive forces between the magnets. The magnet pairs are located such that copper thermal extractor fin segments attached to the same thermal bus bar are between them, within the housing. The field change necessary for refrigeration is produced by rotating the wheel containing the magnetic material through the stationary field produced by the magnet pairs. The material's temperature is highest in the high field regions and lowest in the low field regions. The helium within the housing acts as a heat transfer medium conducting heat between the working material and the thermal extractor. The two copper segments at the high field regions and the thermal bus bar to which they are attached are at the refrigerator's highest temperature. Heat rejection from the refrigerator occurs by conduction through these elements. Similarly, the two copper segments at the low field regions and the thermal bus they are attached to are at the refrigerator's lowest temperature. The refrigerator absorbs heat by conduction through these elements. No heat transfer occurs while the working material traverses the regions between the stainless steel segments because the thermal conductivity of steel is very small. Thus, switching enabling heat transfer is achieved by providing a suitable environment at locations where heat transfer is to occur.

The performance of this refrigerator may be limited because of the need to use gaseous helium in the housing to transfer heat across the gap between the moving solid magnetic working material and the solid copper of the thermal extractor. The thermal conductivity of helium gas is the smallest of any material in the refrigerator. To achieve maximum heat transfer very small gaps between the magnetic material and the thermal extractor must be maintained. This leads to potential difficulties in fabrication, assembly and operation due to tolerance accumulation, thermal contraction effects and component wear.

A magnetic refrigerator with thermal conduction as the heat transfer mode between its components, and operating in the range between 1.8 K. and 4.7 K., as would be required in the production of He II, must maintain a minimum clearance gap between the magnetic material exhibiting the magnetocaloric effect and solid copper heat exchangers transferring heat into and out of the refrigerator. In prior art magnetic refrigerators, the minimum clearance has proven difficult to maintain in the fabrication and assembly of the refrigerators.

The efficacy of the heat transfer modes into and out of the magnetic refrigerator are critical to refrigerator performance. Three primary heat transfer mechanisms are conduction in a gas or solid, convection of a gas or liquid, and phase change of a fluid, e.g. boiling or condensation. The simplest refrigerators use conduction, which also yields the most severe performance limitation of the three mechanisms. The unit described above, suggested by U.S. Pat No. 4,702,090, utilizes conduction through solid copper buses and helium gas for heat transfer into and out of the refrigerator. Heat transfer here is limited by the thermal conductivity of copper and helium gas in the 1.8 K. to 15 K. temperature range and the intercomponent gap. The convective heat transfer mechanisms of some proposed magnetic refrigerators require the pumping of a gas or liquid for heat transfer. Phase change mechanisms are limited to specific temperatures where phase changes occur, e.g. 4.2 K., for normal boiling liquid helium. As an alternative to a single heat transfer mechanism in magnetic refrigerators, it has been proposed to use high conductance heat pipes which transport heat by an evaporation-condensation cycle of fluid; helium or hydrogen have been proposed for refrigerators operating below 20 K.

The use of high field superconducting magnets to produce the most efficient magnetic refrigeration imposes substantial mechanical loads on the support structure of the refrigerator. The support structure must be sufficiently massive and rigid to resist the forces imposed without substantial deformation, and yet must not constrain the mechanical operation of the magnetic refrigerator or create a significant thermal addenda with consequent loss of refrigeration efficiency, and must not permit undue heat transfer between hot and cold regions.

SUMMARY OF THE INVENTION

The magnetic refrigerator described here is a rotary device in which the magnetic working material is carried by a wheel cyclicly through regions of high and low magnetic field produced by symmetrically placed stationary pairs of superconducting magnets. The wheel and magnetic material are enclosed in a housing. Heat transfer into and out of the magnetic material occurs by conduction. Heat transfer is switched on and off at appropriate housing locations by changing the thermal conductance of the housing material.

The magnetic refrigeration apparatus of the present invention uses a modular design comprised of housing modules and magnet pairs. The housing modules and the magnet pairs are stacked in an alternating arrangement so that each module is sandwiched between two magnet pairs. A wheel is rotated within each of the housing modules so that each point of the wheel moves into and out of two separate magnetic field zones within each of the modules. Each module, with a set of magnet pairs, constitutes a complete refrigerator.

Each of the modules contains a rotating wheel with the necessary bearing and drive gear assembly. Each of the wheels has a plurality of cutout regions in which elements of magnetic material are shaped to correspondingly fit therein. There are two magnetic elements for each cutout region; a wave spring is sandwiched between the elements so that the magnetic material is in slidable contact with and pressed against the enclosing housing as the wheel is slowly rotated. The pressing of the elements against the housing thus minimizes the clearance gap between the magnetic material and the housing regions where heat transfer occurs. The magnetic refrigeration apparatus utilizes the magnetocaloric effect by which certain magnetic materials increase in temperature when placed in a magnetic field and decrease in temperature when removed from the field. When entering the magnetic field at a high temperature heat transfer region, the magnetic material in the wheel increases in temperature and rejects heat. When the magnetic material of the wheel leaves the magnetic field, it decreases in temperature and passes to a low temperature heat transfer region where it absorbs heat.

The magnets are superconducting and are designed preferably to produce a maximum flux density of approximately 5 Tesla at the position of the magnetic material. The magnets are in a vacuum and are cooled to the temperature of the cold heat exchanger by conductive heat transfer paths. The magnets are all identical and are connected serially so that all carry the same energizing current. The magnet pairs on opposite sides of a module have oppositely directed fields.

Heat transfer into and out of each module occurs through copper heat exchangers incorporated into the module housing. The heat exchangers are open copper structures allowing liquid helium to circulate through them for efficient heat transfer. The heat transfer path from the module interior to the liquid helium is through the thin base of these heat exchangers. Each module contains eight integral heat exchangers, four in the housing top and four in the bottom. Four of the heat exchangers are high temperature heat exchangers and four are low temperature heat exchangers. A forced-flow stream of liquid helium passes through the high temperature heat exchangers, absorbing heat from the refrigerator. The low temperature heat exchangers absorb heat from either a stagnant subcooled He II bath or a forced-flow subcooled He II stream. He II at the refrigerator's low temperature heat exchanger provides enhanced heat transfer between the refrigerator and the object being cooled.

In operation, the wheel of each module carries the magnetic material cyclically between high and low magnetic field zones. In low field zones the magnetic refrigerant absorbs heat. Conversely, heat is transferred out of the refrigerant in the high magnetic field zones. In this manner, the magnetic refrigeration apparatus operates on an approximate Carnot cycle, there being two cycles per rotation of the wheel.

The magnetic refrigeration apparatus has application to any system requiring cooling at temperatures below the normal boiling point of $^4$He. Examples include superconducting magnet cooling, cooling superconducting RF cavities, and cooling superconducting magnetic energy storage devices.

Further objects, features, and advantages of the invention will be apparent from the following detailed description taken in conjunction with the accompanying drawings.

DESCRIPTION OF THE PREFERRED EMBODIMENT

Figure 1:
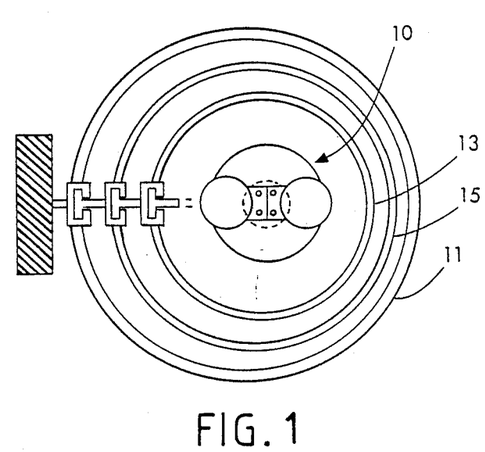
FIG. 1 is a top schematic view of a refrigeration system incorporating the magnetic refrigeration apparatus of the present invention.
Figure 2:
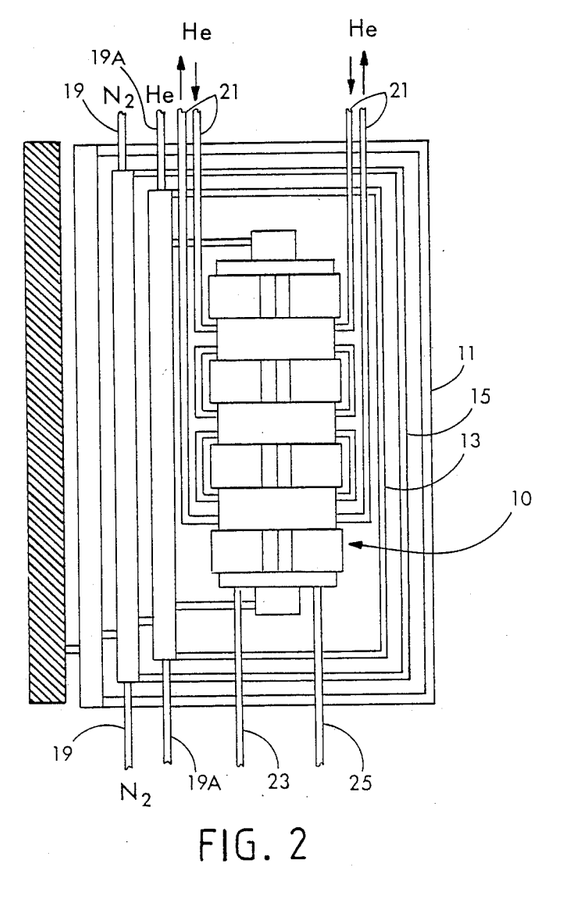
FIG. 2 is a side schematic view of a refrigeration system incorporating the magnetic refrigeration apparatus of the present invention.

With reference to the drawings, the magnetic refrigeration apparatus of the present invention is shown schematically at 10 in FIGS. 1 and 2. The entire magnetic refrigeration apparatus 10 will have the structural parts thereof encased in a vacuum chamber 11 and cooled to cryogenic temperatures. The vacuum chamber 11 encompasses thermal shields 13 and 15 formed, for example, of copper or aluminum preferably covered with layers of metal coated plastic or superinsulation. The magnetic refrigeration apparatus 10 is encased within the thermal shield 13; the thermal shield 13 fits within the thermal shield 15; and the thermal shield 15 fits within the vacuum chamber 11. The thermal shield 15 insulates the enclosed parts from temperatures above 77 K. A line 19 circulates liquid nitrogen through the shield 15. The thermal shield 13 insulates the magnetic refrigeration apparatus 10 from temperatures above 4.7 K. A line 19A circulates liquid helium through the shield 13. Parts within the shield 13 are cooled by forced-flow subcooled helium lines 21. Various penetrations in the vacuum chamber 11 provide access for the lines 21, a drive shaft 23, and control system sensor connections 25. The sensors connected to the sensor connections 25 would be typically indicative of such variables as temperature, pressure, current, voltage, frequency, and torque within the magnetic refrigeration apparatus 10. FIGS. 1 and 2 schematically represent one of a number of possible configurations of the vacuum chamber 11 and surrounding shields. Though the magnetic refrigeration apparatus 10 is depicted having a horizontal orientation, it is noted that the magnetic refrigeration apparatus 10 will operate in any orientation, provided care is taken to ensure the integrity of the connections to the magnetic refrigeration apparatus 10.

Figure 3:
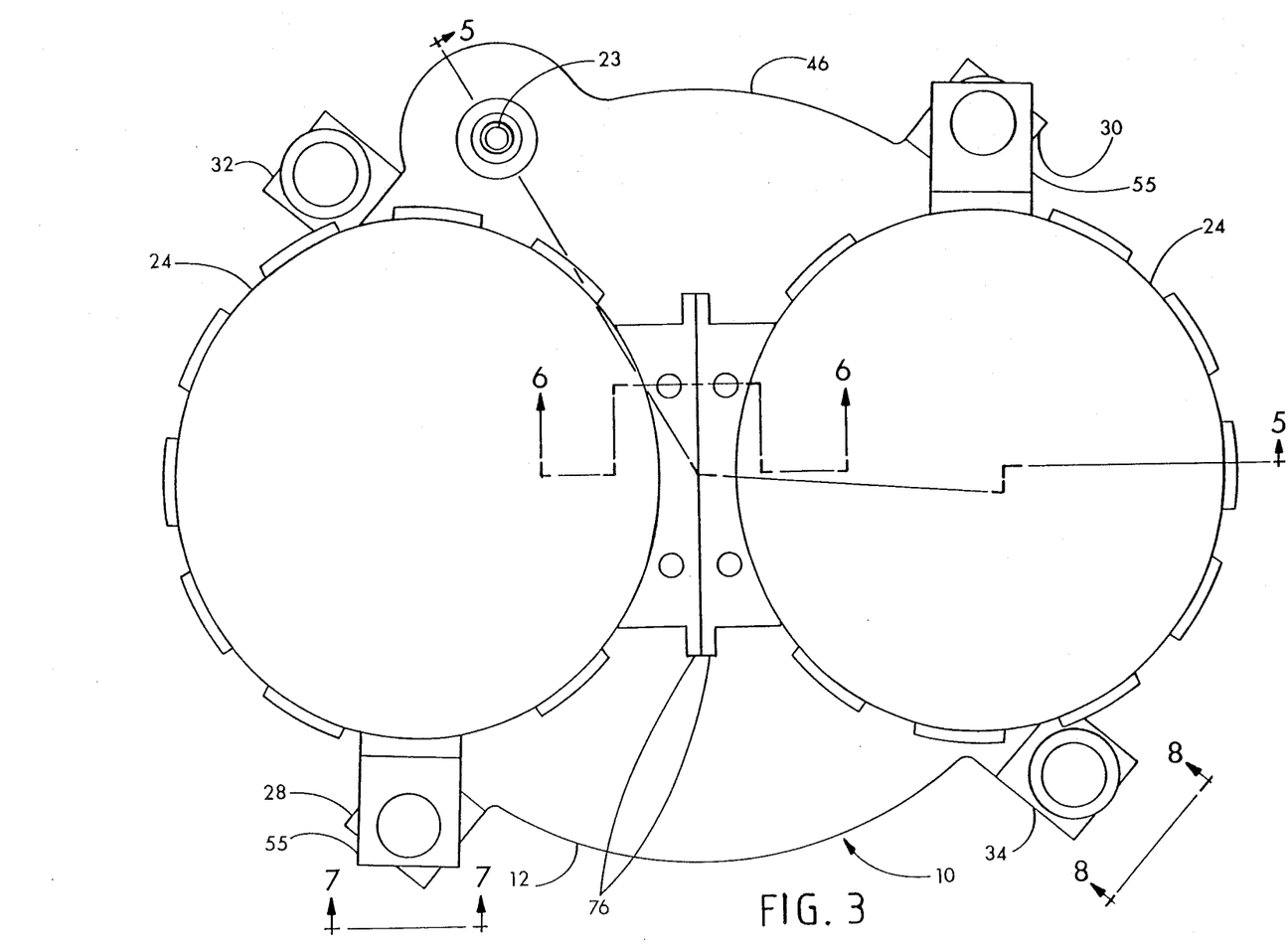
FIG. 3 is a top plan view of the magnetic refrigeration apparatus to produce superfluid helium.
Figure 4:
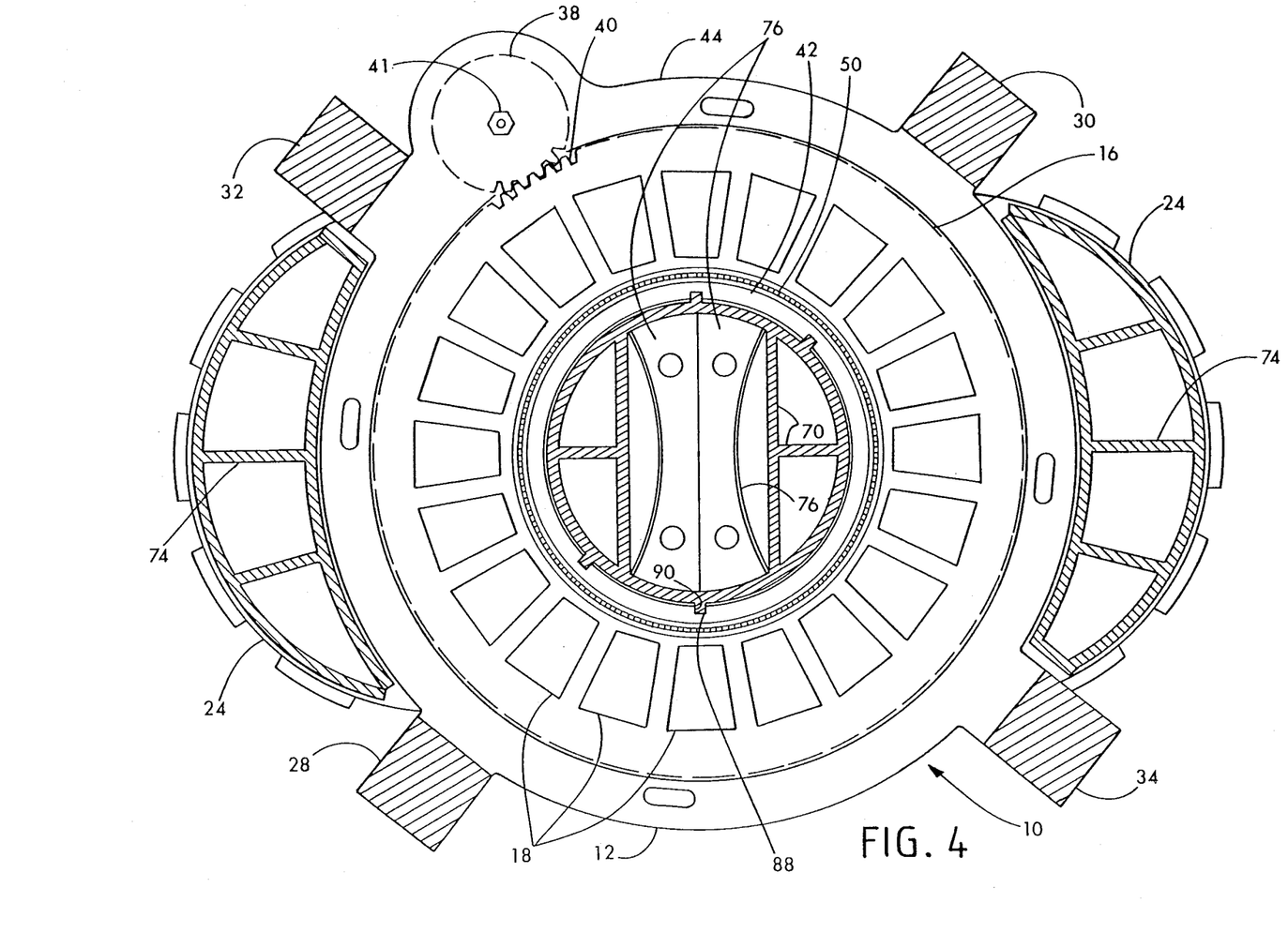
FIG. 4 is a top plan view of the magnetic refrigeration apparatus with the upper housing plate of the top module removed.
Figure 5:
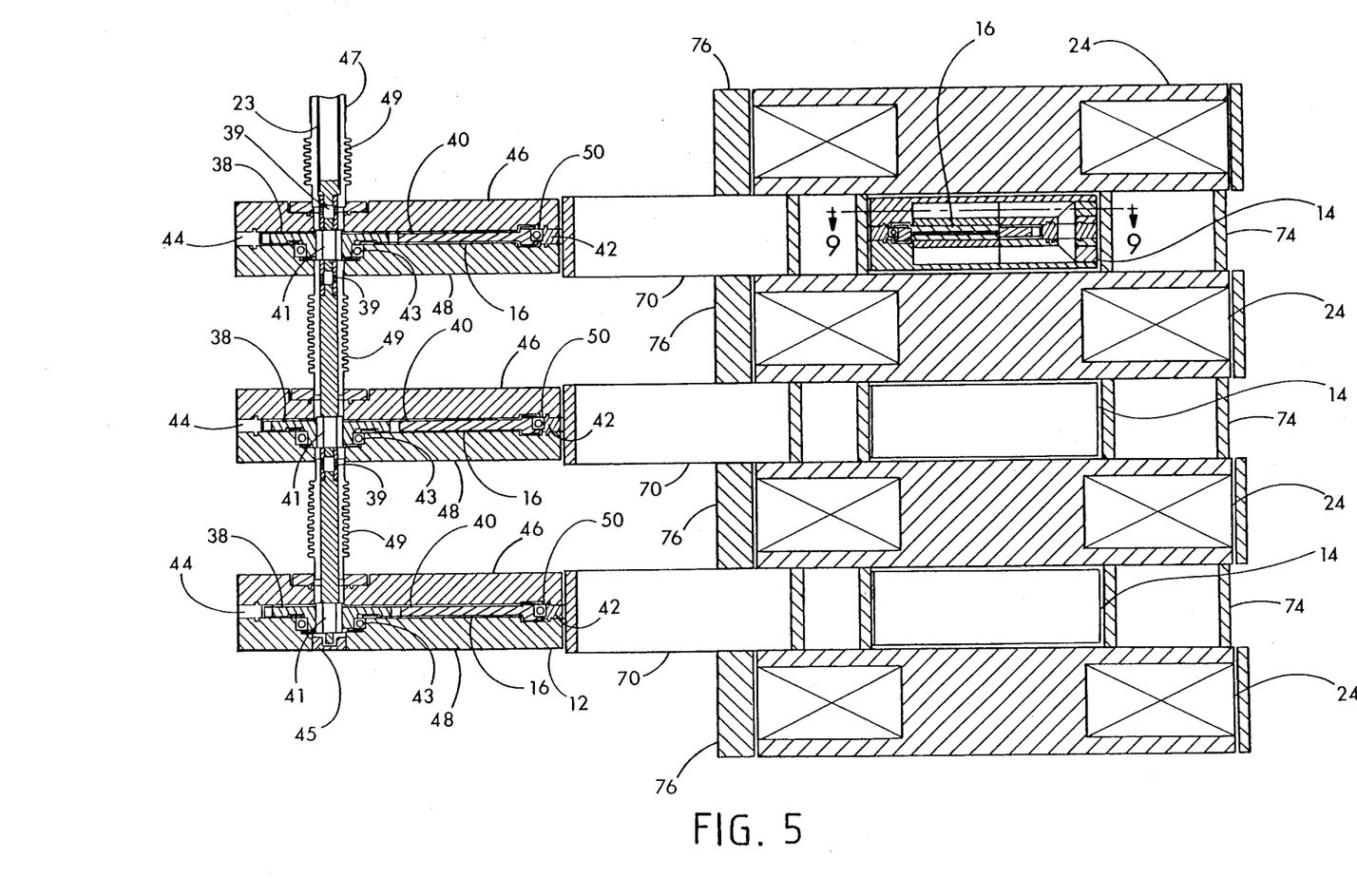
FIG. 5 is a cross-section taken along the line 5—5 of FIG. 3.
Figure 6:
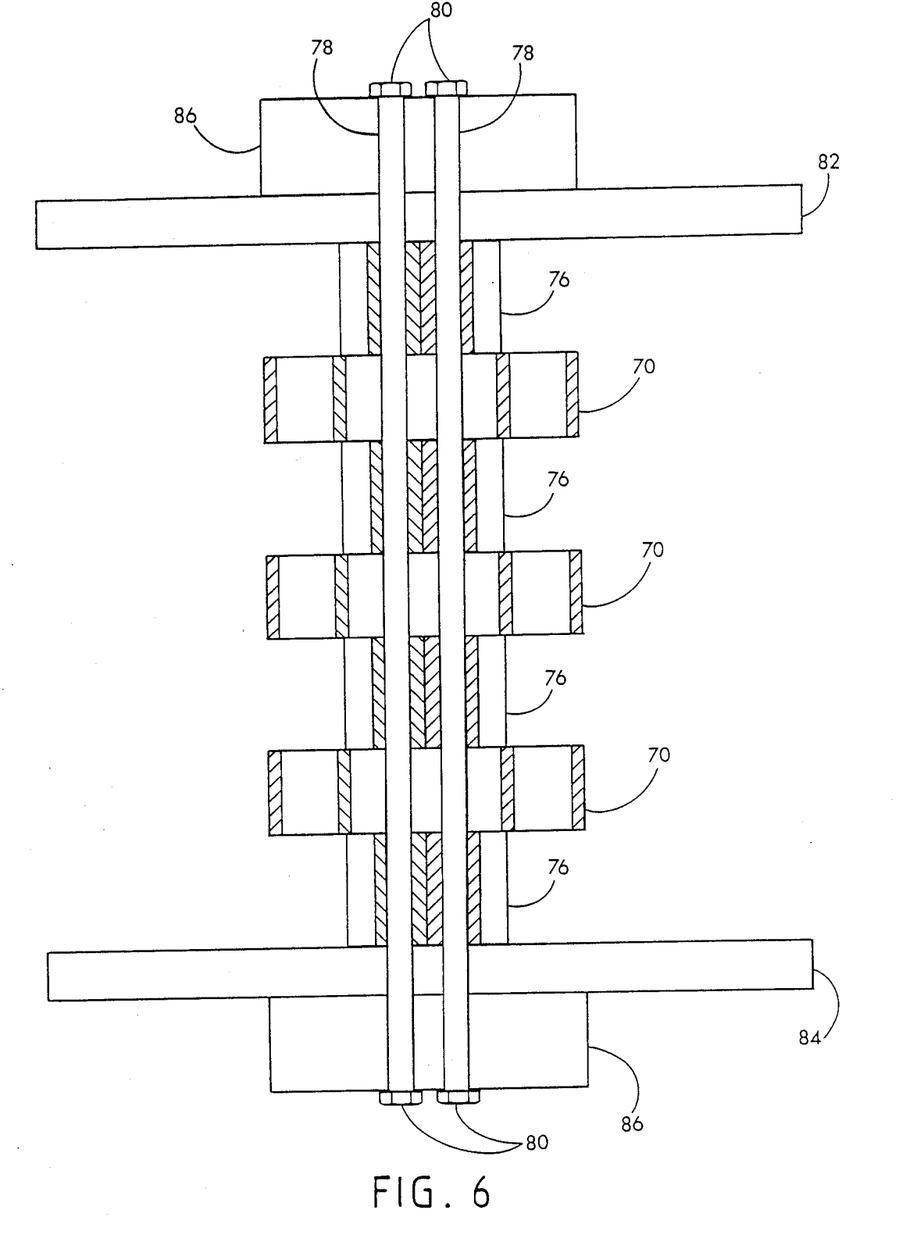
FIG. 6 is a cross-section view taken along the line 6—6 of FIG. 3.
Figure 11:
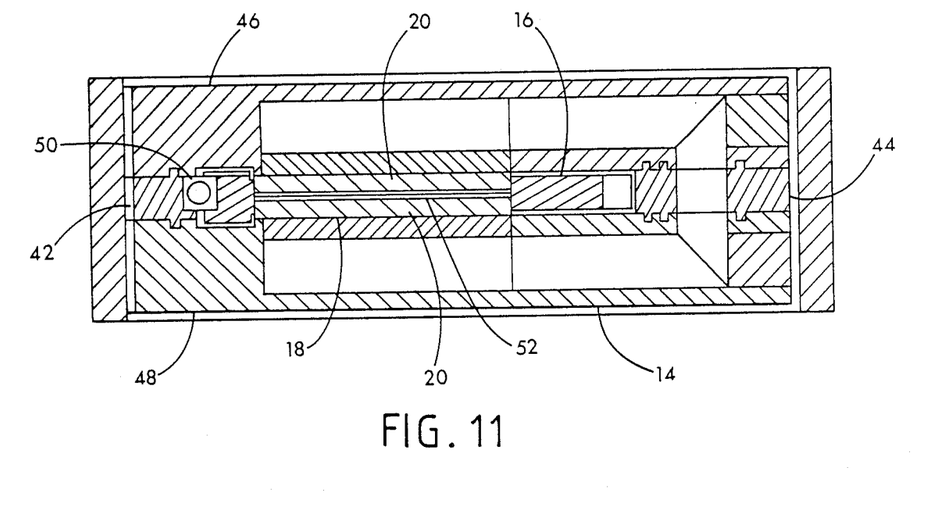
FIG. 11 is an enlarged detail view of the magnetic material elements contained within the cutout regions of the wheel and biased against the housing.

As depicted in FIGS. 3, 4, and 5, the magnetic refrigeration apparatus 10 includes a housing 12 having a plurality of housing modules 14. FIG. 5 shows the detail for only the top module, the other modules being identical. FIG. 11 shows an enlarged detail of a typical module. The magnetic refrigeration apparatus 10 utilizes the magnetocaloric effect, by which certain magnetic materials increase in temperature when placed in a magnetic field and decrease in temperature when removed from the field. In the case of the present invention, a wheel 16 rotates through each of the modules 14, the wheel 16 having cutout regions 18 in which elements 20 of paramagnetic or ferromagnetic material are inserted therein. The wheels 16 rotate through two separate magnetic field zones within the housing modules 14. The magnetic field zones are created by magnets 24 that are in stacked relation with the housing modules 14 such that a magnet 24 is positioned above and below a portion of each of the wheels 16. The wheels 16 and the magnets 24 are thus stacked in alternating fashion. The stacking of the magnets 24 and the modules 14 is best depicted in FIG. 5. The magnetic refrigeration apparatus 10 has heat exchanger connectors 28, 30, 32, and 34, best seen in FIGS. 3 and 4. The connectors 28 and 30 are connected to low temperature heat exchangers; the connectors 32 and 34 are connected to high temperature heat exchangers. The heat exchangers are explained in greater detail below. The low temperature heat exchangers are located in zones of low magnetic field where the elements 20 are cooled in passing to the zone of low magnetic field from a high magnetic field zone. Upon rotation, the elements 20 continue moving, passing from the low magnetic field zone to the high magnetic field zone. The elements 20 warm during this transfer by the magnetocaloric effect. Heat is transferred out of the elements 20 via the high temperature heat exchangers in the zones of high magnetic field. Heat transfer within the refrigeration apparatus 10 occurs by conduction and is more fully explained below.

The wheels 16 are driven by a drive motor (not shown) located outside of the thermal shields 13 and 15, and the vacuum chamber 11. The drive motor may be, for example, a Bodine DC motor and controller. The Bodine motor controller allows motor speed control from distances up to 400 feet, which permits remote operation. The motor turns the drive shaft 23 which enters through the shields 13 and 15 through a ferrofluid seal (not shown) to hermetically seal the vacuum chamber 11. The drive shaft 23 has a drive pinion gear 38 that mates with a flange ring gear 40 which is formed as part of the wheels 16, as best shown in FIG. 4. The pinion gear 38 is preferably machined of 310 stainless steel to match the thermal contraction of the wheel 16 and to minimize eddy current heating. As shown in FIG. 5, flexible couplings 39, splines 41, pinion bearings 43, and a plug 45 all form a means to mount the drive shaft 23 and transmit rotation therethrough. The drive shaft 23 is contained within a housing tube 47 that has bellows 49 to allow for thermal expansion and contraction. Each of the housing modules is comprised of an inner housing plate spacer 42, an outer housing plate spacer 44, an upper housing plate 46, and a lower housing plate 48. A possible alternate configuration is to have modules comprised of housings with only upper and lower plates mated on their edges. Each of the housing modules 16 is hermetically sealed with indium metal gaskets. The wheels 16 are bounded by the respective plates 42, 44, 46, and 48 of the housing module 14 through which a particular wheel rotates. FIG. 4 depicts the arrangement of the wheel 16 in the top module 14 with its upper housing plate 46 removed. The arrangement of the other modules 14 is the same. The wheels 16 are mounted for rotation upon bearings 50 which extend around the circumference of each of the wheels 16. The bearings 50 are preferably ABEC grade 5 bearings. One configuration of the bearing 50 includes Be-Cu races, $MoS_2$ lubricated balls, and a filled Teflon cage. The wheels 16 are rotated so that each of the elements 20 are repeatedly magnetized and demagnetized. Though the present invention is oriented for counterclockwise rotation of the wheels 16, it is possible to construct a magnetic refrigeration apparatus in accordance with the present invention utilizing clockwise rotation.

The wheel 16 is composed of a material which is a poor heat conductor at cryogenic temperatures, for example, titanium alloys or stainless steel. As noted above, the wheel 16 has cutout regions 18 in which elements 20 of paramagnetic or ferromagnetic material are shaped to fit therein. As best shown in FIG. 11, the elements 20 are bonded to a non-magnetic backing plate 52, the element 20 and its respective backing plate 52 together fitting within a particular cutout region 18 of the wheel 16. It may also be possible to utilize elements 20 of appropriate shape without the backing plates 52. Suitable paramagnetic and ferromagnetic materials are described in U.S. Pat. No. 4,408,463 to Barclay et al., the disclosure of which is incorporated by reference. Gadolinium gallium garnet ($Gd_3 Ga_5 O_{12}$) and gadolinium molybdate ($Gd_2 (Mo O_4)_3$) are preferred materials for the elements 20 in that they have satisfactory magnetocaloric effect properties at low cryogenic temperatures. Each of the cutout regions 18 have two elements fitted therein and a wave spring sandwiched between the backing plates 52 that are inserted within a respective cutout region 18. The wave springs are typically 0.25 mm inches thick and are small relative to the other components. Thus the wave spring in this cutout region shown in FIG. 11 is not visible on the scale depicted. The elements 20 are therefore not attached to the wheel 16 but are rather urged or biased against the upper housing plate 46 and the lower housing plate 48 by the wave spring, and are pushed through the respective housing module 14 upon rotation of the wheels 16 by edge contact with the cutout regions 18. The biasing of the elements 20 against the housing plates 46 and 48 assure the smallest possible heat transfer gap between the elements 20 and the housing module 14.

The magnets 24 are arranged to provide the requisite magnetic field for two refrigeration cycles for each wheel cycle. FIG. 4 shows the layout of the magnets 24 with respect to wheel rotation; FIG. 5 shows a cross-section view which shows the magnets 24 stacked in interleaving fashion with the wheels 16 such that each wheel 16 has magnets 24 positioned both above and below the wheel. In the depicted embodiment, the magnetic refrigeration apparatus 10 has three housing modules 14 and four pairs of magnets 24, the housing module 14 in the middle sharing pairs of magnets 24 with the other two modules 14. The modules 14, combined with the adjoining magnetic pairs, each constitute a complete refrigerator. Other numbers of modules are possible.

The magnets 24 are superconducting and are cooled to the temperature of the low temperature heat exchangers by conductive heat paths. The magnets 24 are all identical and are connected serially so that all magnets 24 carry the same energizing current. Magnet pairs on opposite sides of a module 14 have oppositely directed fields. In one configuration, the magnets 24 are solenoidal coils wound with NbTi wire insulated with Formvar and having a copper-superconductor ratio of 1.35. The magnets 24 will be continuously energized by an external power supply to allow relatively easy protection in the event of quench.

Figures 9, 10:
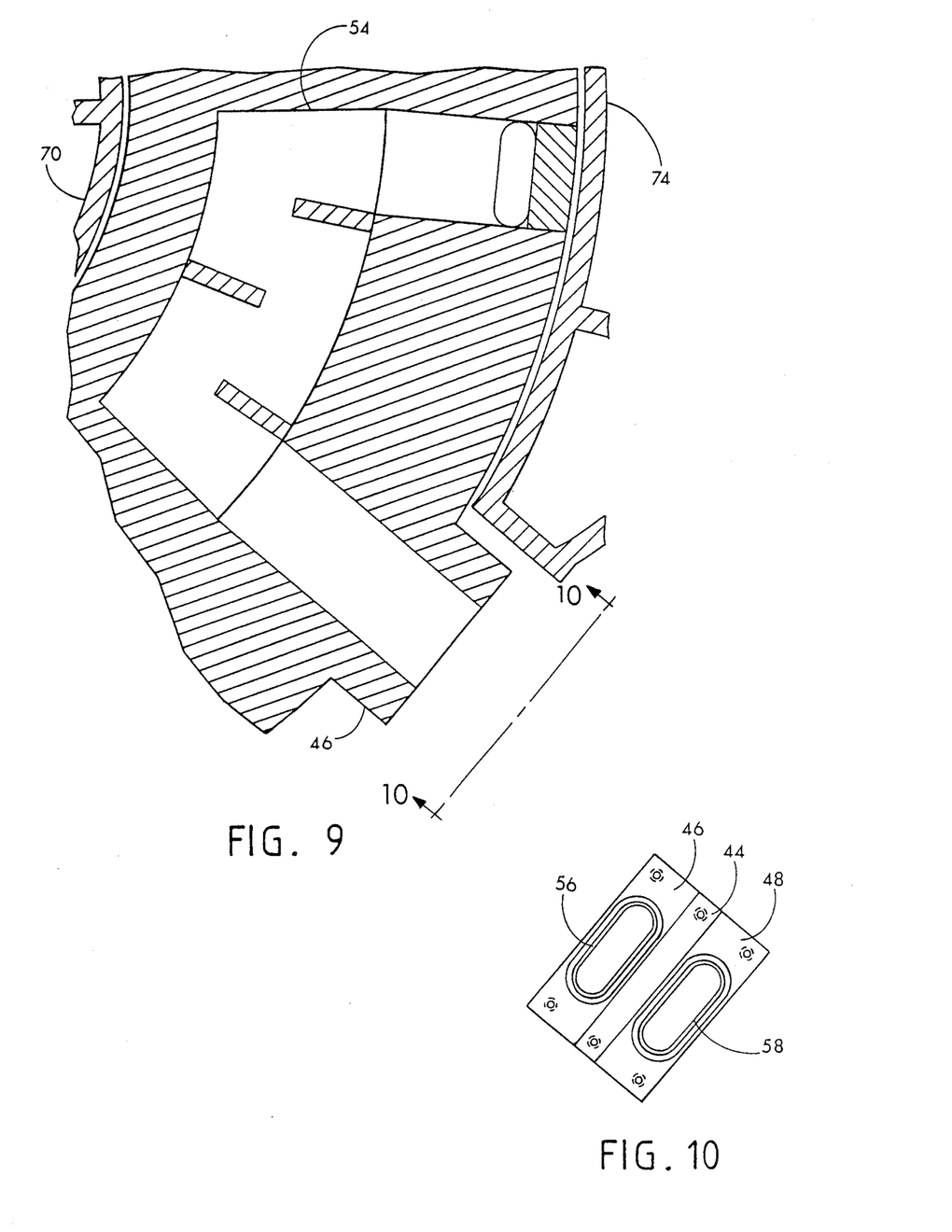
FIG. 9 is a cross-section view taken along the line 9—9 of FIG. 5.
FIG. 10 is a view taken along the line 10—10 of FIG. 9.

Heat transfer into and out of each housing module 14 occurs through the low temperature heat exchangers and the high temperature heat exchangers. Each of the heat exchangers that are in communication with the connectors 28, 30, 32, and 34 are incorporated into the housing module 14. For each connector 28, 30, 32, and 34, there is one heat exchanger 54 positioned in the upper housing plate 46 of each module 14 above the wheel 16 and one heat exchanger 54 in the lower housing plate 48 of each module 14 below the wheel 16. Each housing module 14 therefore contains eight integral heat exchangers 54, four in the upper housing plate 46 and four in the lower housing plate 48. FIGS. 5 and 9 show the heat exchanger 54 that is in communication with the heat exchanger connector 34 in the upper housing plate 46 of one of the modules 14. This heat exchanger is, however, typical of the geometry of all of the heat exchangers, whether the heat exchanger is a low temperature heat exchanger or a high temperature heat exchanger. FIG. 10 shows an inlet 56 and an outlet 58 through which liquid helium circulates through the heat exchanger 54. The heat exchangers 54 are open copper structures or plumbing allowing liquid helium to circulate through them for efficient heat transfer.

Heat transfer within each module 14 is by conduction from the elements 20 to the copper heat exchanger 54 through the small gap. The wave springs between the two elements 20 in each cutout region 18 press the elements against the housing plates 46 and 48 to assure the smallest possible heat transfer gap. The gap is filled with a low pressure heat transfer gas, preferably helium 3. Helium 3 is preferably used as the heat transfer medium because, in the temperature range of interest, it has a thermal conductivity three times that of helium 4. The pressure of the helium 3 gas is chosen to be less than the vapor pressure of liquid helium 3 at the lowest temperature of the elements 20.

FIGS. 5 and 11 show a section of a housing module 14 with details of the plates 46 and 48, the wheel 16 and the elements 20 as inserted within the wheel 16. The surface of the plates 46 and 48 is 310 stainless steel with the heat exchangers 54 being embedded and brazed thereto. Experience with machining stainless steel-copper composite surfaces indicated that common machining techniques remove more of the softer copper than the harder stainless steel. By allowing contact of the elements 20 against the housing plates 46 and 48, the gap between the elements 20 and the heat exchanges 54 is just the amount by which the copper is relieved below the stainless steel.

Figure 7:
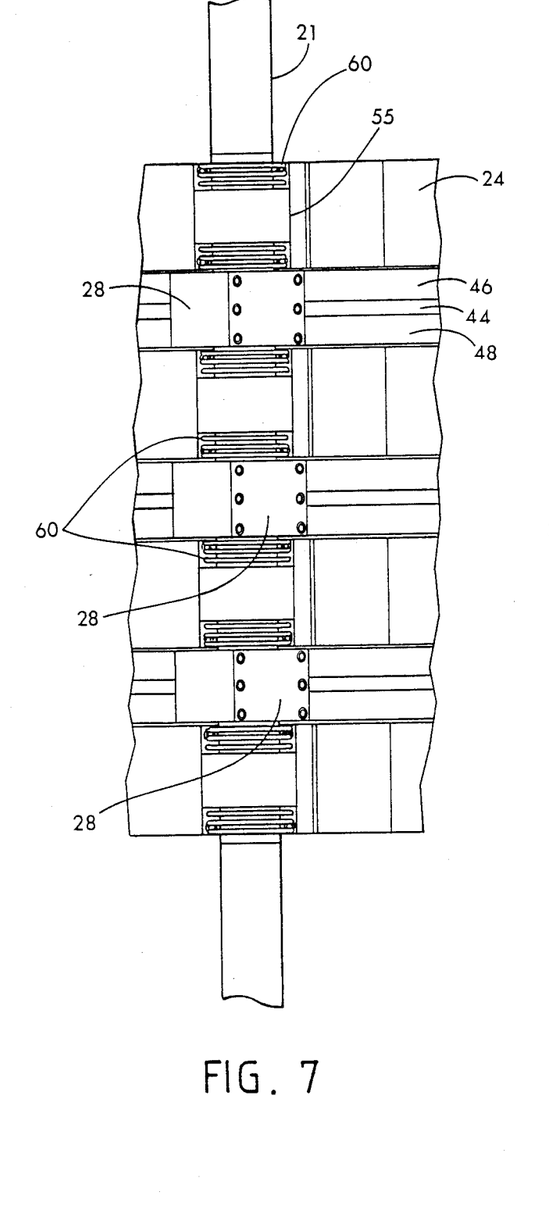
FIG. 7 is a view taken along the line 7—7 of FIG. 3.
Figure 8:
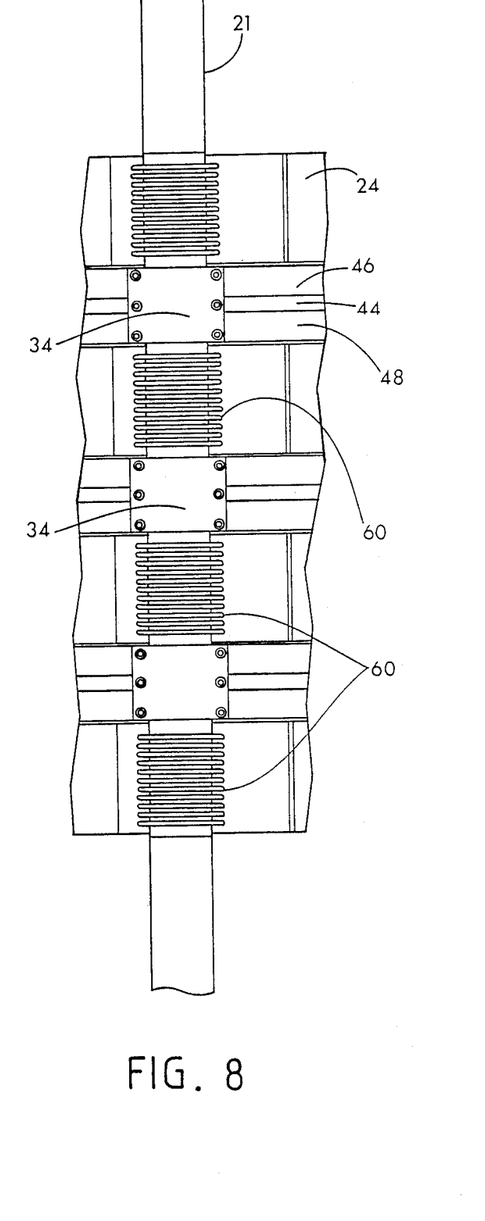
FIG. 8 is a view taken along the line 8—8 of FIG. 3.

The lines 21 as schematically represented in FIG. 2 represent two separate flow paths. In the first flow path, the lines 21 are connected to the high temperature heat exchangers (i.e., those exchangers connected to connectors 32 and 34). Liquid helium flows into the high temperature heat exchangers by the first flow path, and leaves the high temperature heat exchangers as a liquid carrying with it the heat produced by the magnetic refrigeration apparatus 10. In the second flow path, the lines 21 are connected to the low temperature heat exchangers (i.e., those exchangers connected to connectors 28 and 30). The lines 21 of the second flow path contain static liquid helium which will conduct heat to the magnetic refrigeration apparatus. The second flow path will also conduct heat from the magnets 24 via magnetic cooling mounts 55 to maintain the magnets 24 at their operating temperature. The lines 21 connected to the low temperature heat exchange connectors 28 and 30 thus have heat exchange to either a stagnant subcooled superfluid helium bath (not shown) or a forced-flow subcooled He II stream and the lines 21 connected to the high temperature heat exchange connectors 32 and 34 have forced-flow liquid helium flowing within. The lines 21 have bellows 60 to allow for thermal expansion and contraction. FIG. 7 shows the line 21 as connected to the low temperature heat exchanger connectors 28 and 30, and the magnetic cooling mounts 55. FIG. 8 shows the line 21 as connected to high temperature heat exchanger connectors 32 and 34. Inlets and outlets 58 are connected to their respective lines 21, either incoming or return by the respective heat exchange connectors.

Heat transfer through the magnetic refrigeration apparatus 10 can be traced from the cold temperature source to the hot temperature sink. In tracing this heat flow path the various heat transfer modes are identified. These modes include:

(1) helium normal fluid-superfluid turbulent counterflow conduction in the He II between the cold temperature source and the magnetic refrigeration apparatus 10, or forced convection He II heat transfer;

(2) heat transfer from the He II to the low temperature copper heat exchangers 54 (connected to the connectors 28 and 30) of the magnetic refrigeration apparatus 10;

(3) thermal conduction through the low temperature copper heat exchangers;

(4) heat transfer from the low temperature copper heat exchangers to the helium 3 gas within the magnetic refrigeration apparatus 10;

(5) conduction through the helium 3 gas in the cold regions of the magnetic refrigeration apparatus 10;

(6) heat transferred to the elements 20 from the helium 3 gas in the cold regions of the magnetic refrigeration apparatus 10;

(7) heat transfer within and by the elements 20;

(8) heat transfer from the elements 20 to the helium 3 gas in the hot regions of the magnetic refrigeration apparatus 10;

(9) conduction through the helium 3 gas in the hot regions of the magnetic refrigeration apparatus 10;

(10) heat transfer from the helium 3 gas to the high temperature copper heat exchanges 54 (connected to the connectors 32 and 34) of the magnetic refrigeration apparatus 10;

(11) conduction through the high temperature copper heat exchangers;

(12) heat transfer from the copper high temperature heat exchangers to a forced-flow subcooled helium stream of the magnetic refrigeration apparatus 10.

The support structure of the magnetic refrigeration apparatus is best shown in FIGS. 4, 6, 7, and 8. The support structure is intended to support the large attractive forces of the magnets 24 without exerting large forces on the module housings 14 nestled between the magnets 24. This is accomplished by internal axial magnet support assemblies 70 which bridge the space between the magnets 24 at a diameter inside the inner diameter of the housing modules 14. External axial magnet support assemblies 74 bridge the space between the magnets 24 at a diameter outside the outer diameter of the housing modules 14. The internal and external magnet supports 70 and 74 are the primary means of supporting the attractive forces acting along the axis of the magnetic refrigeration apparatus 10. In addition, the radial forces between the magnets 24 are supported by magnet couplers 76 that bridge the radial space between the magnets 24. The entire structure is held together by four long threaded rods 78 passing through holes in the internal axial magnet for assemblies 70 and in the magnet couplers 76. Nuts 80 are used to secure the threaded rods 78. A top cap 82 and a bottom cap 84 act as flux return paths for the magnet flux. A hanger mounting block 86 acts as a seat for the nuts 80. The housing modules 14 are located about the periphery of the internal axial support assembly 70 by slots 88 that receive keys 90 of the internal axial support assembly 70. The housing modules 14 are separated from the magnets 24 by epoxy loaded fiberglass (G-10) pads (not shown) mounted on the housing 12.

Figure 12:
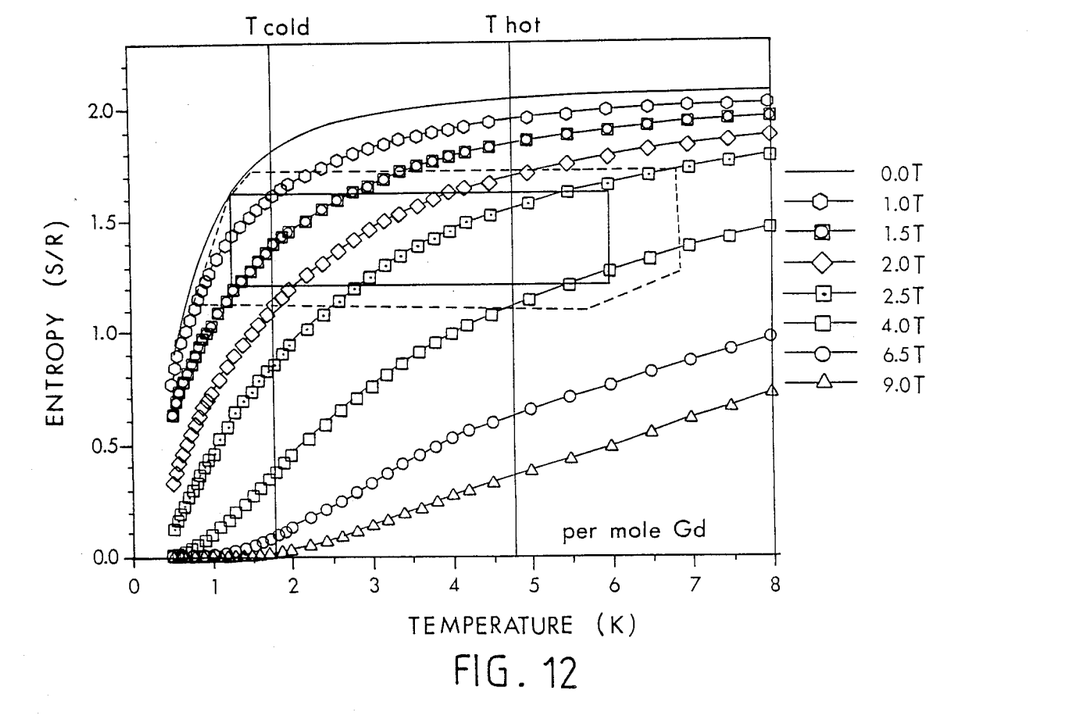
FIG. 12 is a plot of temperature (K) versus normalized entropy (S/R) and magnetic field strength (T) for gadolinium gallium garnet and with the cycle for the magnetic refrigeration apparatus superimposed, the ideal cycle being shown in a solid line and the predicted actual cycle shown in a dashed line.

The magnetic refrigeration apparatus operates on an approximate Carnot cycle. FIG. 12, which shows the entropy of gadolinium gallium garnet for various magnetic fields plotted against temperature, depicts two cycles. The ideal cycle path for a particular small magnetic material element as the element rotates through the housing module 14 is shown as a solid line in FIG. 12; the actual non-ideal cycle path is shown as a dashed line. The ideal cycle path is bounded by two isentropes and two isotherms and includes finite heat transfer at the high and low temperature isotherms; the non-ideal cycle path includes other effects, such as friction, the influence of actual magnetic field profiles and additional finite heat transfer effects. When $T_{cold}$ is 1.8 K. and $T_{hot}$ is 4.7 K. and the material is gadolinium gallium garnet, the magnetic fields necessary to operate may be derived from FIG. 12. In operation, the wheel 16 carries the elements 20 of gadolinium gallium garnet cyclically through high and low magnetic field zones. In low field regions the elements 20, cooled in passing to the low magnetic field zone from a high magnetic field zone by the magnetocaloric effect, absorb heat at the low temperature heat exchangers. The elements 20 are then carried by the wheel 16 in succession to a high magnetic field zone. The elements 20 warm during this transfer according to the magnetocaloric effect. Heat is transferred out of the refrigerant in the high magnetic field zone and the high temperature heat exchangers. Heat transfer is accomplished according to the modes previously described.

In the start up mode, helium at 4.7 K., 0.221 MPa (18 PSIG) is diverted from the incoming central stream to the magnetic refrigeration apparatus 10. This forced-flow subcooled helium stream is split into two streams. One of the two streams is passed serially through the twelve hot heat exchangers of the modules 14, absorbing the heat exhausted by the magnetic refrigeration apparatus 10. This first stream is then returned to the central helium system. The second stream flows through a heat exchanger (not shown) and then passes serially through the twelve cold heat exchangers of the magnetic refrigeration apparatus 10 to the cold temperature source. After flowing through the cold temperature source the stream passes back through the heat exchanger, cooling the incoming stream. The second stream is then joined to the first stream that had passed through the hot heat exchangers of the magnetic refrigeration apparatus 10 to be returned to a central helium system. During start up, the stream diverted to the cold end of the magnetic refrigeration apparatus is gradually cooled at the heat exchanger (not shown) to the lambda transition temperature. At the transition temperature, valves in the cold stream line are closed and a stagnant volume filled with He II is formed. At this point, heat transfer at the cold end of the magnetic refrigeration apparatus 10 changes from heat transfer from a forced-flow subcooled helium stream to heat transfer from stagnant He II. Heat transfer between the magnetic refrigeration apparatus 10 and the cold temperature source occurs by turbulent normal fluid-superfluid counterflow. After the valves in the cold helium lines are closed, the entire helium flow diverted from the central supply line begins to pass through the hot heat exchangers of the magnetic refrigeration apparatus, enhancing heat transfer at the hot end of the magnetic refrigeration apparatus.

It is understood that the invention is not confined to the particular construction and arrangement of parts and method of operation described herein, but embraces all such modified forms thereof as come within the scope of the following claims.

What is claimed is:

1. Magnetic refrigeration apparatus comprising:
   (a) magnetic material which exhibits the magnetocaloric effect mounted for movement;
   (b) means for producing a magnetic field at a position over a portion of the magnetic material such that each point of the magnetic material can be moved into and out of the magnetic field as the material is moved;
   (c) a high temperature heat exchanger located proximate the portion of the magnetic material in the magnetic field;
   (d) means for conducting liquid helium through the high temperature heat exchanger;
   (e) a low temperature heat exchanger located proximate the portion of the magnetic material outside the magnetic field; and,
   (f) means for conducting He II through the low temperature heat extractor.

2. The apparatus of claim 1 wherein the means for conducting liquid helium through the high temperature heat exchanger conducts liquid helium under conditions of forced flow.

3. The apparatus of claim 1 wherein the means for conducting He II through the low temperature heat exchanger conducts He II under conditions of forced flow.

4. The apparatus of claim 1 wherein He II is in contact with the low temperature heat exchanger as a stagnant subcooled He II bath.

5. The apparatus of claim 1 wherein the magnetic material is gadolinium gallium garnet.

6. The apparatus of claim 1 wherein the magnetic material is gadolinium molybdate.

7. The apparatus of claim 1 further including a wheel and a means for driving the wheel, the magnetic material forming a part of the wheel.

8. The apparatus of claim 7 wherein the magnetic material is inserted within a correspondingly shaped cutout portion of the wheel.

9. The apparatus of claim 8 wherein the magnetic material is attached to a backing plate and the backing plate and magnetic material are together inserted within the correspondingly shaped cutout portion of the wheel.

10. The apparatus of claim 8 further including a housing through which the wheel rotates and a means for urging the magnetic material in slidable contact with the housing upon movement of the wheel.

11. The apparatus of claim 10 wherein there are two pieces of magnetic material shaped to fit within the cutout portion, and wherein the means for urging the magnetic material in slidable contact with the housing upon movement of the wheel is a spring such that the pieces of magnetic material are separated by the spring and thereby biased against the housing.

12. The apparatus of claim 11 wherein the spring is a wave spring.

13. The apparatus of claim 11 wherein there is a gap between the housing and the magnetic material, and wherein a heat transfer gas is contained within the gap.

14. The apparatus of claim 13 wherein the heat transfer gas is helium 3.

15. The apparatus of claim 13 wherein the heat transfer gas is helium 4.

16. The apparatus of claim 8 wherein the means for producing the magnetic field includes a plurality of solenoidal coils formed of superconducting windings, the solenoidal coils being positioned above and below the wheel in the region of the high temperature heat exchanger.

17. The apparatus of claim 16 wherein there are a plurality of wheels in stacked relation within the housing, the solenoidal coils being stacked in interleaving fashion with the wheels in the region of the high temperature heat exchanger.

18. Magnetic refrigeration apparatus comprising:
   (a) a plurality of wheels mounted for rotation about a central axis, the wheels each having a portion formed of magnetic material that exhibits the magnetocaloric effect;
   (b) a plurality of solenoidal coils formed of superconducting windings to produce a magnetic field at the portion of the wheels such that the magnetic material of the wheels can be moved into and out of the magnetic field as the wheels are rotated, the solenoidal coils being stacked in interleaving fashion with the wheels so that each wheel has solenoidal coils above and below the wheel;
   (c) a high temperature heat exchanger located proximate the portion of the wheel in the magnetic field; and
   (d) a low temperature heat exchanger located proximate the portion of the wheel outside the magnetic field.

19. The apparatus of claim 18 wherein the magnetic material of the wheel is gadolinium gallium garnet.

20. The apparatus of claim 18 wherein the magnetic material is gadolinium molybdate.

21. The apparatus of claim 18 further including a means for driving the wheels.

22. The apparatus of claim 21 wherein the magnetic material is inserted within correspondingly shaped cutout portions of the wheels.

23. The apparatus of claim 22 wherein the magnetic material is attached to a backing plate and the backing plate and magnetic material are together inserted within the correspondingly shaped cutout portion of the wheel.

24. The apparatus of claim 22 further including a housing through which the wheels rotate, and a means for urging the magnetic material in slidable contact with the housing upon movement of the wheels.

25. The apparatus of claim 24 wherein there are two pieces of magnetic material shaped to fit within each cutout portion, and wherein the means for urging the magnetic material in slidable contact with the housing upon movement of the wheel is a spring such that the pieces of magnetic material are separated by the spring and thereby biased against the housing.

26. The apparatus of claim 25 wherein the spring is a wave spring.

27. The apparatus of claim 25 wherein there is a gap between the housing and the magnetic material, and wherein the heat transfer gas is contained within the gap.

28. The apparatus of claim 27 wherein the heat transfer gas is helium 3.

29. The apparatus of claim 27 wherein the heat transfer gas is helium 4.

30. The apparatus of claim 18 wherein the high temperature heat exchanger includes a means for conducting liquid helium therethrough and wherein the low temperature heat extractor includes a means for conducting He II therethrough.

31. The apparatus of claim 30 wherein the means for conducting liquid helium through the high temperature heat exchanger conducts liquid helium under conditions of forced flow.

32. The apparatus of claim 30 wherein the means for conducting He II through the low temperature heat exchanger conducts He II under conditions of forced flow.

33. The apparatus of claim 30 wherein the low temperature heat exchanger contacts a stagnant subcooled He II bath.

34. Magnetic refrigeration apparatus comprising:
    (a) a housing;
    (b) a wheel mounted for rotation about a central axis within the housing, the wheel having a part of which is formed of magnetic material that exhibits the magnetocaloric affect;
    (c) means for urging the magnetic material in slidable contact with the housing upon movement of the wheel;
    (d) means for producing a magnetic field at a position over a portion of the magnetic material such that each point of the magnetic material can be moved into and out of the magnetic field as the material is moved;
    (e) a high temperature heat exchanger located proximate the portion of the magnetic material in the magnetic field; and
    (f) a low temperature heat exchanger located proximate the portion of the magnetic material outside the magnetic field.

35. The apparatus of claim 34 wherein the magnetic material is gadolinium gallium garnet.

36. The apparatus of claim 34 wherein the material is gadolinium molybdate.

37. The apparatus of claim 34 further including a means for driving the wheel.

38. The apparatus of claim 34 wherein the magnetic material is inserted within a correspondingly shaped cutout portion of the wheel.

39. The apparatus of claim 38 wherein the magnetic is attached to a backing plate and the backing plate and magnetic material are together inserted within the corresponding shaped cutout portion of the wheel.

40. The apparatus of claim 38 wherein there are two pieces of magnetic material shaped to fit within the cutout portion, and wherein the means for urging the magnetic material in slidable contact with the housing upon movement of the wheel is a spring such that the pieces of magnetic material are separated by the spring and thereby biased against the housing.

41. The apparatus of claim 40 wherein the spring is a wave spring.

42. The apparatus of claim 38 wherein there is a gap between a the housing and the magnetic material, and wherein a heat transfer gas is contained within the gap.

43. The apparatus of claim 42 wherein the heat transfer gas is helium 3.

44. The apparatus of claim 42 wherein the heat transfer gas is helium 4.

45. The apparatus of claim 34 wherein the means for producing the magnetic field include a plurality of solenoidal coils formed of superconducting windings, the solenoidal coils being positioned within the housing above and below the wheel in the region of the high temperature heat exchanger.

46. The apparatus of claim 34 wherein there are a plurality of wheels in stacked relation within the housing, the solenoidal coils being stacked in interleaving fashion with the wheels so that each wheel has magnets above and below the wheel in the region of the high temperature heat exchanger.

47. The apparatus of claim 34 wherein the high temperature heat exchanger includes a means for conducting liquid helium therethrough and wherein the low temperature heat exchanger includes a means for conducting He II therethrough.

48. The apparatus of claim 47 wherein the means for conducting liquid helium through the high temperature heat exchanger conducts liquid helium under conditions of forced flow.

49. The apparatus of claim 47 wherein the means for conducting He II through the low temperature heat exchanger conducts He II under conditions of forced flow.

50. The apparatus of claim 47 wherein the low temperature heat exchanger contacts to a stagnant subcooled He II bath.

* * * * *